United States Patent [19]

Lam

[11] Patent Number: 4,494,200

[45] Date of Patent: Jan. 15, 1985

[54] PROCESS AND APPARATUS FOR FIXING THE POSITION OF A MOVING VEHICLE ON A MAP

[75] Inventor: Do Mau Lam, Velizy, France

[73] Assignee: Matra, France

[21] Appl. No.: 338,627

[22] Filed: Jan. 11, 1982

[30] Foreign Application Priority Data

Jan. 14, 1981 [FR] France .............................. 81 00571

[51] Int. Cl.³ ............................................. G06F 15/50
[52] U.S. Cl. .................................. 364/449; 364/443; 340/988; 340/995; 343/5 MM
[58] Field of Search ............... 364/424, 443, 444, 447, 364/449, 460, 433; 340/24, 27 NA; 343/378, 450, 451, 5 MM, 7 TA, 50 P; 73/178 R; 353/11, 12

[56] References Cited

U.S. PATENT DOCUMENTS

| | | | |
|---|---|---|---|
| 3,208,336 | 9/1965 | Vago | 364/443 |
| 3,226,058 | 12/1965 | Meneley | 343/5 MM |
| 3,359,408 | 12/1967 | Briggs | 364/460 |
| 3,457,013 | 7/1969 | Henf | 343/5 MM |
| 3,555,179 | 1/1972 | Rubin | 343/5 MM |
| 4,122,521 | 10/1978 | Rick et al. | 364/443 |
| 4,138,726 | 2/1979 | Girault et al. | 364/443 |
| 4,175,285 | 11/1979 | Dansac et al. | 343/5 MM |
| 4,253,150 | 2/1981 | Scovill | 364/444 |
| 4,347,511 | 8/1982 | Hofmann et al. | 343/5 MM |

Primary Examiner—Gary Chin
Attorney, Agent, or Firm—Larson and Taylor

[57] ABSTRACT

For fixing the position of a moving vehicle, typically an aircraft, a map of a strip of ground along the theoretical path of the vehicle is prepared. The map has two parts. The transparency i at each point of one part is in direct relation with the value of a predetermined parameter representative of the ground at that point, typically the altitude. The transparency at each point in the other part is in inverse relation of the parameter. During movement of the vehicle, the successive actual values of the parameter are measured and stored over a distance p. Such values are used for modulating light fluxes which are directed along a plurality of bands each representative of distance p, in succession. A correlation factor is determined for each band based on integration of light fluxes received by sensors through the bands in succession. The location of the band on the map which corresponds to the best correlation is determined and used for fixing the position.

11 Claims, 5 Drawing Figures

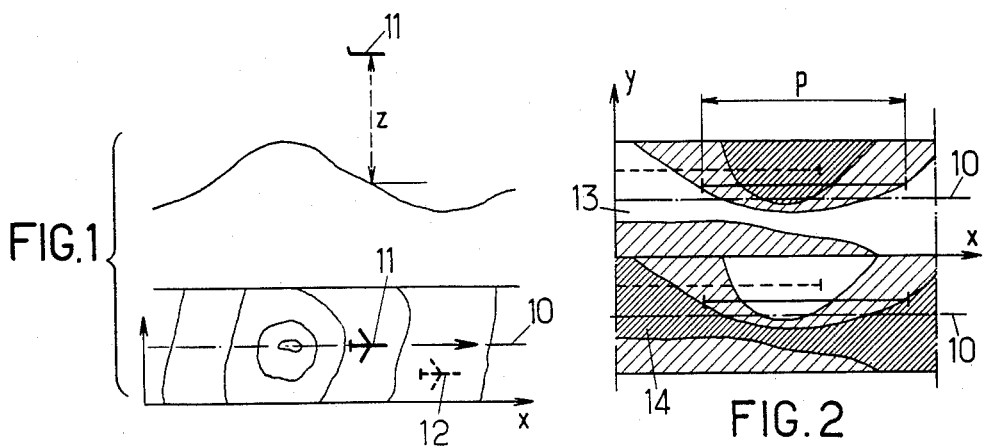
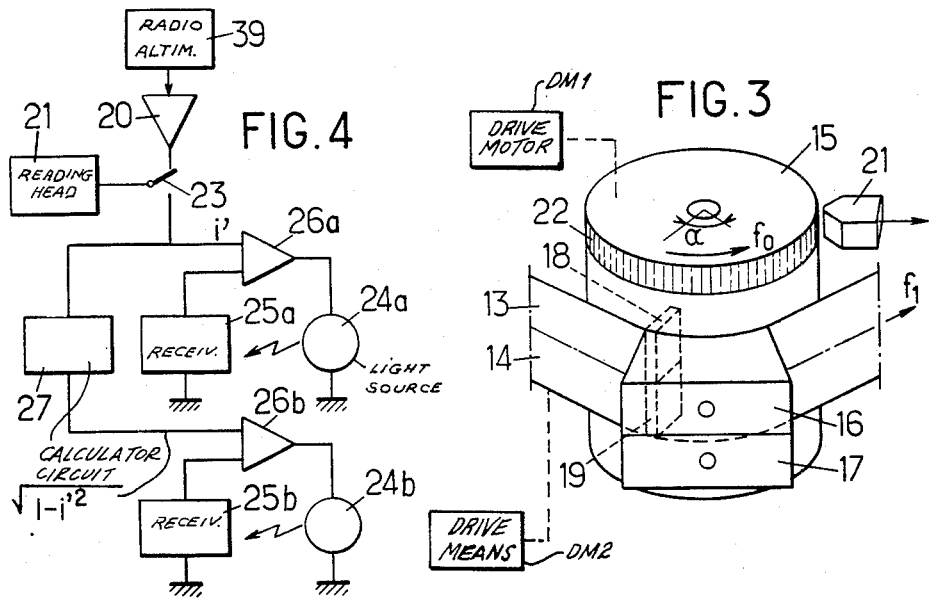
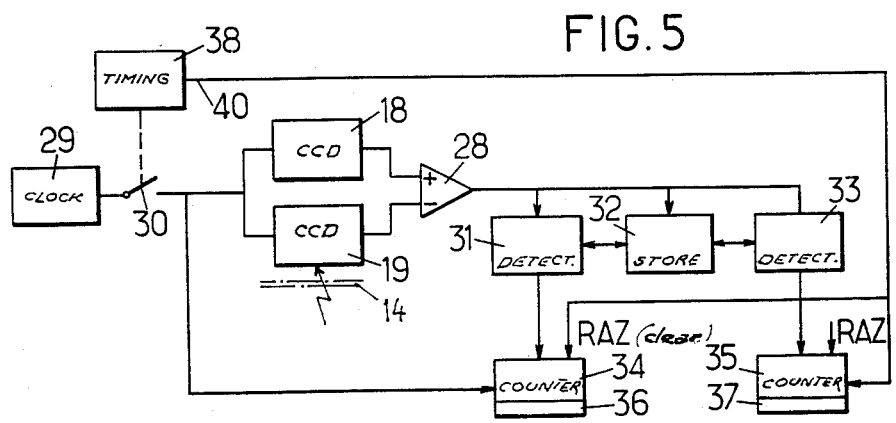

PROCESS AND APPARATUS FOR FIXING THE POSITION OF A MOVING VEHICLE ON A MAP

BACKGROUND AND SUMMARY OF THE INVENTION

The present invention relates to a process and apparatus for fixing the position of a moving vehicle, whose direction of movement is known, on a map giving the distribution of a physical parameter measurable from the moving vehicle in a region surrounding a nominal or preestablished path of the moving vehicle. It is intended to solve the numerous navigational and guidance problems which occur for guiding moving bodies along a theoretical path to which they must be brought back in case of deviation.

Navigational processes and apparatuses of this type are already known, using terrain matching ("Aviation Week and Space Technology", Feb. 25, 1974, pp. 48-51; IEEE Transactions on Aerospace and Electronic Systems Vol. AES-15, No. 4, July 1979, pp. 547-554). Most are complex or require prestoring and measuring a number of parameter values.

It is an object of the invention to provide a process and apparatus using a simple procedure and requiring measurement of one parameter only, of relatively low cost.

According to the invention, a map is prepared which has two complementary parts in which the transparencies at each point, i and i, are in direction relation with and in inverse relation with the value of a predetermined parameter at this point relatively; during flight of the vehicle, the successive values of the parameter measured from the moving body are stored over a line of length l; the total light which pass through bands of said map parallel to the theoretical path and at a variable distance therefrom when there is directed across one of the two parts light of an intensity (flux) which, is directly related to the measured and stored parameter and across the other of the two parts light an intensity (flux) is inversely related to the two parts light an intensity (flux) this parameter, for several relative longitudinal positions along the line and the map, and the transverse and longitudinal position of the line is determined for which a correlation factor obtained from the measurement of the light fluxes is optimum.

The invention uses the fact that, in many cases, the direction of the course followed by a moving body whose position is to be fixed on a map is known, the differences with respect to the theoretical position corresponding simply to lateral offsets. By way of example, a problem which is easily solved using the invention consists of establishing the actual position of a manned or unmanned aircraft along its theoretical route and perpendicularly thereto, the parameter then being the height above the ground; another use is establishing the position of a boat, aircraft or missile along its set route and transversely thereto, using a magnetic field map. Then accurate measurement of the value and possibly direction of the local magnetic field is required.

Electrooptical correlator systems for providing an indication as to the degree of cross-correlation function between two signals are known (U.S. Pat. No. 3,283,133); however, there is no indication of the use of complementary reference documents, particularly maps, designed for navigational purpose.

According to another aspect of the invention, a navigation apparatus comprises means for receiving a two-part map providing a representative of a strip of ground on each side of a nominal path, one of the parts having at each point a transparency which is an increasing function of the value of a parameter at the point and the other a transparency which is a decreasing function of the parameter; lighting means are placed on one side of the map and direct, over a fraction of given length thereof, a light flux which, for the fraction on one part and for each longitudinal position, is an increasing function of the stored value of the parameter measured from the moving body and which, for the fraction on the other part, is a decreasing function of said stored value; means are provided for measuring the light fluxes which pass through several bands parallel to the moving direction, at varying distances from the theoretical path; means shift the longitudinal position of the illuminated fraction of the map; and correlation means determine the transverse position and the longitudinal position of the band for which a predetermined function of the light fluxes received is maximum or minimum.

SHORT DESCRIPTION OF THE DRAWINGS

FIG. 1 is a diagram showing an elevational view and a plan view of the theoretical path of an aircraft with respect to the ground and with respect to a map representing a strip of ground on both sides of the theoretical path.

FIG. 2 is a diagram showing a fragment of a transparent map for implementing one embodiment of the invention.

FIG. 3 is a simplified diagram of the mechanical and optical parts of an apparatus for implementing the invention.

FIG. 4 is a block diagram of part of an electronic circuit for storing the measurements of the parameter over a predetermined length p of the actual path in the apparatus.

FIG. 5 is a block diagram of another part of the electronics.

DETAILED DESCRIPTION OF PARTICULAR EMBODIMENTS

Before describing the invention, some information will be given concerning the correlation techniques and how they can be used for guidance problems by ground matching.

It will be first assumed that is is sufficient to determine the actual location of an aircraft 11 along a predetermined path 10 from which it does not deviate.

If $z(x)$ designates the actual height above the ground of the aircraft flying at constant absolute altitude and $z_0(x)$ designates the variation of the height along the path on the map, the localization may be achieved by finding the value of $x_0$ for which the cross-correlation function (in the mathematical sense of the term) is maximum:

$$\int_0^p [z(x) \cdot z(x + x_0)] dx \qquad (1)$$

In formula (1), p designates the length of the line over which the correlation is carried out.

Alternatively, the value $x_0$ for which there is a minimum of the function $$\int_0^p [z(x) - z_0(x - x_0)]^n dx \quad (2)$$

may be determined with n being a positive integer which may be equal to 2, which corresponds to finding the minimum value of the mean quadratic deviation: then expressions (1) and (2) are equivalent if z and $z_0$ are randomly varying and ergotic and if the value p is great enough.

In practice, it will be generally advantageous to adopt the expression (2) and n will be selected depending on the characteristics which are expected to be most significant. If n has a high value, typically greater than 2, the correlation is effected by attaching special importance to the deviation peaks when correlating the curves representing the variation of the parameter. If, on the other hand, n is given a low value, equal to or slightly higher than 1, the correlation puts emphasis on the number of points where the curves are close to each other.

The terms "correlation factor" will be used hereafter for designating a value assigned to each possible position on the map of a segment of predetermined length p of the actual path along which the parameter was measured and stored, which value assumes a maximum (or minimum) value for the position in which there is the best possible match between the variations as measured and the variations on the map, as regards the selected criteria.

The integration may be carried out by using analog or digital values. The use of digital signals digitized at two levels only may present a particular advantage: then, the correlation factors given by formulae (1) and (2) coincide. This solution may be used when special importance is attached to coincidence of the peculiarities of the variation of the parameter for position fixing.

As pointed out above, the invention is applicable when the moving body, which may be assumed to be an aircraft, maintains substantially the theoretical direction of flight at all times. As shown in FIG. 1, the aircraft deviates from its theoretical path 10 in the lateral direction only. Consequently, determination of the correlation factor may always take place over path lengths p parallel to the direction of the theoretical path 10. The correlation factor will have to be determined for several values of x (variable deviations from the expected position in the direction of the path) and y (deviations perpendicular to this direction); the search will take place over a length and width of the map around the theoretical or expected position 11 sufficient for the actual position 12 to be found therein.

A method of implementing the invention will now be described in which the search for the optimum correlation factor is effected by using a map formed in two parts 13, 14 giving respectively a representation of the values at each point of two functions i, $\bar{i}$, varying between 0 and 1, of the parameter, which will be assumed to be the altitude z over ground of an aircraft flying level at a constant absolute altitude, or sin z. The two functions are related to each other by the relationship:

$$\bar{i} = \sqrt{1 - i^2}$$

The function i may be an analog, generally linear, representation of z. More frequently, the function i will be a digital representation of z, with a number of quantization levels which may be low.

Each of the parts of the map will represent the variations of the parameter (z or sin z) over a strip of ground left and right of the theoretical path 10 sufficiently wide for, at the measuring rate provided, the aircraft not leaving it between the successive updating operations.

The actual height z above the ground is measured continuously and stored upon a distance p behind the aircraft (FIG. 2) along the actual path and represented in the form of two functions i'(x) and $\bar{i}'(x)$ varying between 0 and 1 and related by the same relationship as i and $\bar{i}$:

$$\bar{i}' = \sqrt{1 - i'^2}$$

The the value of a predetermined function, which assumes a minimum or maximum value when the actual variation in altitude over ground exactly matches the variation on the map is computed. The function may be:

$$S = i \cdot i' + \bar{i} \cdot \bar{i}' \quad (3)$$

If there is a completed match, S=1; in all other cases, S will be lower than one. If it is considered that $i = \cos \theta$ and $i' = \cos \psi$ where the angles $\theta$ and $\psi$ have no physical significance and are used for calculation purposes only:

$$S = \cos \theta \cos \phi + \sin \theta \sin \phi$$
$$= \cos (\theta - \phi)$$

It is seen that S is equal to 1 if $\theta = \psi$ and $i = i'$: the optimum cross-correlation will correspond to a maximum value of S.

Instead of function S, a function D may be used which is:

$$D = |i \cdot \bar{i}' - \bar{i} \cdot i'| \quad (4)$$

which, with the same notation as above, may be written:

$$D = |\sin (\theta - \psi)|$$

Then a minimum value of D will correspond to optimization of the correlation.

There will now be described, with reference to FIGS. 3 to 5, an apparatus for measurement of the total flux passing through each of a plurality of parallel bands or strips by integration in time and which in a practical way gives the function S or D.

The mechanical part of the apparatus, shown schematically in FIG. 3, comprises a drum 15 against which the map formed from two parts 13 and 14 placed side by side bears along a length having an angular extension $\alpha$ substantially less than 360°. The map will generally be a photographic film whose construction is particularly simple when binary coding is used: then, each part is the negative of the other. The means for directing the light fluxes or intensities i' and $\bar{i}'$ through the map are shown in the form of light boxes 16, 17 having light sources providing a light flux which may be accurately modulated and with a low time constant. The light boxes 16, 17 are respectively associated with the parts 13, 14 which they illuminate in the portion of the parts bearing on cylinder 15. The latter carries light detection and integration means which will be assumed to be two charge coupling detector strips, generally called CCD. The intervals between detector elements along the strips 18,19 will determine the spacing pitch of the bands along which the correlation will be carried out.

The drum 15 is provided with means which will typically be an electric step by step or synchronous motor represented by drive motor DM1, for rotating it in the direction indicated by arrow $f_0$ and at high speed, compatible with the time constant of the CCD. The map is also provided with drive means, indicated at DM2, for advancing it step by step in the direction of arrow $f_1$. This arrangement constitutes means for varying the locations of the bands on the map formed by parts 13 and 14.

The apparatus further comprises means for measuring and storing the successive actual values of the parameter, which will be assumed to be the height z above the ground, and for modulating the intensities or fluxes $i'$ and $i'$ as a function of the stored data. In the embodiment shown in FIG. 4, these means comprise a radio-altimeter 39 which may be conventionally associated with a system receiving information from a barograph and an inertial unit. The system has an amplifier 20 associated with a magnetic read and write head 21. The system consisting of 39, 20 and 21 provides for measurement and storage of the variations of the height z above the ground for a period which will be generally of a few minutes in the case of an aircraft. Head 21 may cooperate with an erasable magnetic storage device, such as a magnetic tape, a magnetic disk or a digital memory, after digitization of the signal. However, a solution which is of particular interest, since it eliminates synchronization problems, consists in storing the actual (measured) values by temporarily recording therein on a magnetic strip 22 carried by cylinder 15 (FIG. 3). The storage may then be effected over an angular distance $\alpha$ exactly corresponding to the length which represents, on the map, the distance over which the values have been measured.

A switch 23 allows, after storage, the reading head, or a second head, to be connected to first and second control means for controlling the light fluxes $i'$ and $\tilde{i}'$. The control means shown in FIG. 4 comprise, for each part, a light source 24a or 24b and a sensor 25a or 25b connected to an amplifier 26a or 26b in a servo-loop. The signal $i'$ representing the altitude is directly applied to the loop amplifier 26a which drives the source 24a for illuminating part 13. The signal $i'$ is applied to an electronic circuit 27 for forming $\sqrt{1-i'^2}$ which in turn controls the amplifier 26a controlling the source 24b illuminating part 14. Source 24 and sensor 25 may be respectively a strip of light emitting diodes or a lamp separated from the map by a translucent panel, and a photo transistor.

The device for measuring the fluxes and for determining the correlation factors and thereby constituting a correlation means may be as shown in FIG. 5; then, the minimum of D as given by formula (4) is searched. The device comprises a clock 29 whose output is connected to the scanning input of strips 18, 19 through a switch 30. A differential amplifier 28 has its input connected to the outputs of strips 18,19. Such inputs receive signals representing the light fluxes received by two corresponding CCD detectors of the two strips. The output of amplifier 28 is connected to a detector 31, whose principal element will be a diode in the case of analog operation, a comparator in the case of digital operation.

Detector 31 may be considered as a detector of "transversal minimum" since it will determine the minimum value among all values each corresponding to the width seen by a particular set of two CCDs. The detector 31 may be associated with a memory 32 for storing the minimum value and which may be a capacitor (analog value) or a register associated with an A/D converter if required. A second detector 33 is provided for detecting the minimum in the longitudinal direction, i.e. for different longitudinal locations of the distance p on the map.

The circuit of FIG. 5 comprises means for identifying the band of length p and of width corresponding to one CCD detector of the scanned zone of the map for which a minimum value of the output of amplifier 28 is obtained. These means comprise two counters 34 and 35. Each of the counters 34, 35 is associated with a corresponding storage register 36 or 37. The up-count input of counter 34 is connected to clock 29 through switch 30 which is controlled by a timing device 38 which, for each 360° rotation of drum 15, delivers a control pulse at an output 40. This output is connected to a "clear" input of counter 34 and to the up-count input of counter 35.

The operation of the device shown in FIGS. 2 to 5 will now be shortly described.

A first step may be considered as a preparation step. It consists in recording in real time the profile of the ground along the actual path. Means (not shown) place switch 23 in the position where it is shown in FIG. 4. From this moment, the signals supplied by the radio-altimeter 39 are stored on the magnetic track 22 by head 21. After writing-in (which will generally last a few minutes), a record of the profile of the ground flown over is available for a length p in magnetically stored form.

At that moment, switch 23 is brought to the position opposite that which is shown in FIG. 4 and the cross-correlation begins. Initialization is provided by resetting counters 34,35 and registers 36,37 to zero responsive to switching.

The correlation step comprises several successive and identical phases, each corresponding to the search for the pair of CCD detectors for which, for a same longitudinal position of the distance of length p on the map, the expression D, as given by formula (4), is minimum.

During each phase, the light received by each detection element of strips 18, 19 over the length p is summed; then serial scanning of the detector pairs 18 and 19 of the strips, one pair at a time takes place while the drum rotates at a constant and high speed (for example, approximately 600 RPM). This summation begins when the beginning of the recording of the actual ground contour on track 22 arrives in registration with head 21 and when, simultaneously, strips 18,19 arrive in registration with the light boxes 16,17. The circuit shown in FIG. 4 then causes lighting of parts 13,14 to vary according to a law representing the variation of terrain elevation above a reference and applies at all times to strips 18,19 illuminations $i'$ and $\tilde{i}'$ corresponding to the sensed height above ground through parts 13,14.

This summation is completed when the strips have integrated the light corresponding to the height variations over length p, the angle $\alpha$ (which is determined by the angular extent of light boxes 16, 17) being selected to correspond at least to distance p. The serial scanning of the detector then takes place while the drum rotates over the remaining angular distance 360°−$\alpha$. It is initiated by the timing device 38 which closes switch 30 so that the clock pulses reach strips 18, 19 and counter 34.

Responsive to the first clock pulse, the output of the first CCD detector of each strip 18, 19 is applied to the differential amplifier 28. The corresponding signal is stored at 32. At the same time, counter 34 counts up by one.

At the second clock pulse, the second pair of CCD detectors is connected to amplifier 28, while counter 34 counts up by one. The minimum detector 31 then compares the value of D stored at 32 and the new value. If the new value is less than the former one, it is written in memory 32 and, at the same time, it causes the contents of counter 34 to be transferred to register 36.

The same operation is repeated until all the pairs of CCD detectors have been scanned. After that scan a number is provided in register 36 representing the transverse position of the pair of strips for which D is minimum. The value of the minimum is stored in memory 32. Thus, a correlation will have been effected in the direction transverse to the path, which will lead for example to storing data corresponding to the path length shown with dashed lines in FIG. 2.

Map 13, 14 is then stepped forward by the timing device 38, at the same time as counter 34 counts up by one. The integration and serial scanning operations mentioned above are repeated and will possibly lead to storing in memory 32 a new minimum, then new transverse and longitudinal positions in registers 36 and 37.

The same phase is repeated until a length of map has been scanned sufficiently long for the segment of length p corresponding to the actual position of the aircraft to be included in that length whatever the deviation. The length the map will be selected depending on the maximum expected deviation from the theoretical location between two successives fixes. The data finally stored in registers 36 and 37 will correspond for example to the segment shown with a continuous line in FIG. 2. The corresponding data may be transferred to the inertial guidance system of the aircraft so as to cause it to revert transversely to its theoretical route and to reset the guidance system in the longitudinal direction.

It can be seen that the apparatus for carrying out a double cross-correlation is simple in design and construction and only uses components currently available and which need not be described. The invention is however not limited to the particular embodiment described and illustrated.

I claim:

1. A process for fixing the position of a moving vehicle having a direction of movement which is predetermined on a map, said process comprising:
    (a) preparing a map of a strip of ground along a theoretical path of movement of the vehicle over an area whose width is equal to the greatest possible expected deviation of the actual path of the vehicle, said map comprising two complementary transparent parts, the transparency $i$ of the map at each point of said area in a first one of said parts being in direct relation to the value of a predetermined ground parameter at that point and the transparency $\bar{i}$ of the map at each point of said area in a second one of said parts being in inverse relation to the value of said predetermined parameter at that point;
    (b) during movement of the vehicle, measuring the successive actual values of said ground parameter from the moving body and storing said actual values over a predetermined distance p;
    (c) directing light of intensity $i'$ whose value is modulated to be a direct function of the actual value of said ground parameter as measured from the vehicle through each successive point in a band of said first part located at a predetermined transverse offset distance from said theoretical path and directing light of intensity $\bar{i}'$ whose value is modulated to be an inverse function of said actual value through each successive point in a band of said second part located at said predetermined transverse offset distance from said theoretical path;
    (d) measuring the cumulative light intensities which pass through said bands, determining the value of a correlation factor based on measurements of said light intensities and storing said value;
    (e) repeating steps (c) and (d) for a plurality of pairs of bands, each pair of bands corresponding to a different value of said predetermined transverse offset distance; and
    (f) determining the pair of bands for which the correlation factor is optimized and which correspond to the actual true position of the moving vehicle on the map.

2. Process according to clim 1 for fixing the position of an aircraft with respect to a theoretical path above ground, wherein sid parameter is altitude of the ground above a predetermined level.

3. Process according to claim 1 or 2, wherein step (f) comprises:
    after the termination of each of steps (c) and (d) with respect to any one of said pairs of bands, comparing the value of the correlation factor obtained for that pair of bands and a previously stored value, and storing the new value in places of the former value if the new value is more optimum and
    storing the transverse distance and the longitudinal distance for which the value of the correlation factor is optimized.

4. Process according to claim 1 or 2, wherein the transparency $\bar{i}$ of the second part at each point is related to the transparency of the corresponding point of the first part by the relation $\bar{i} = \sqrt{1-i^2}$ and wherein the flux $\bar{i}'$ is related to the flux $i'$ by the relation $\bar{i} = \sqrt{1-i'^2}$.

5. Process according to claim 1 or 2, wherein the value of $i \cdot i' + \bar{i}' \cdot \bar{i}'$ or $|i \cdot i' - \bar{i} \cdot i'|$ is determined for each point, a maximum or a minimum is determined for said values and the location in the band corresponding to the maximum or minimum is stored.

6. Process according to claim 1, wherein the first part of the map is a positive representation and the second part is a negative representation.

7. A navigation apparatus for fixing the position of a vehicle moving in a predetermined direction on a map, comprising:
    a map having a first part and a second part providing two different representations of the distribution of the same parameter representative of a predetermined ground condition in the vehicle and over an area whose width to the left and right of said path is at least equal to the greatest possible expected deviation of the vehicle from its theoretical path, the transparency $i$ at each point of said area in said first part being in direct relation to the value of said parameter at the point and the transparency $\bar{i}$ at each point of said area in said second part being to the value of said parameter at that point;

means onboard the vehicle for measuring successive values of said parameter at respective successive locations of the vehicle along its actual path of movement, means for storing said actual values over a predetermined distance p, first and second lighting means located on one side of said first and second parts, respectively, for directing light of controllable intensities through said first and second parts, respectively, first light sensor means, located on the other side of said first part, for accumulating the light received from said first lighting means through an associated band of said first part of length p located at a predetermined transverse offset distance from an expected location of said vehicle along said theoretical path, second light sensor means, located on the other side of said second path, for accumulating the light received from said second lighting means through an associated band of said second part located at said predetermined transverse offset distance from said theoretical path and at the same predetermined distance from said expected location as said band of said first part, first and second control means, operatively connected to said storing means, for controlling one of said lighting means such that the intensity of the light directed through a particular point along said distance p is in direct relation to the stored value of said parameter at said point and for controlling the other lighting means such that the intensity of the light therefrom is in reverse relation to said stored value;

means for varying the location of the associated bands on the map;

and correlation means connected to said first and second light sensor means for determining the transverse position and longitudinal position of the associated bands for which correlation between the light intensities is optimized and which corresponds to the actual true position of the moving vehicle.

8. An apparatus according to claim 7, wherein the first and second light sensor means comprise two strips of light integrating sensors located on a drum rotatable about an axis and adapted to receive the map, said strips being parallel to said axis, whereby accumulation of the light fluxes received through a plurality of bands located at the same longitudinal distance from said expected location and at different transverse distances may be carried out simultaneously.

9. Apparatus according to claim 8, wherein said first and second lighting means comprise respective light sources controlled by said first and second control means in synchronism with the rotation of the drum, whereby the fluxes $i'$ and $\bar{i}'$ delivered at each time are representative of the stored value of said parameter corresponding to the longitudinal distance on the map at which the strips are then located.

10. Apparatus according to claim 8 or 9, wherein the storing means for storing said actual values is located on said drum.

11. Apparatus according to claim 10, wherein said storing means include a magnetic track formed along a circumference of said drum.

* * * * *